US008662506B2

(12) United States Patent
Bengtzen

(10) Patent No.: US 8,662,506 B2
(45) Date of Patent: *Mar. 4, 2014

(54) MULTI-FUNCTION CART

(76) Inventor: Troy Bengtzen, Holladay, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/545,903

(22) Filed: Jul. 10, 2012

(65) Prior Publication Data

US 2013/0015639 A1    Jan. 17, 2013

Related U.S. Application Data

(60) Provisional application No. 61/507,978, filed on Jul. 14, 2011.

(51) Int. Cl.
*B62B 1/04* (2006.01)

(52) U.S. Cl.
USPC ........ 280/30; 280/651; 280/33.998; 280/640; 280/37; 280/47.18; 280/659; 224/576; 224/577; 224/156; 224/157; 224/158; 224/418; 224/484; 296/10; 296/20; 296/24.3

(58) Field of Classification Search
USPC .................. 280/651, 640, 37, 47.26, 33.991, 280/33.998, 659, 47.18; 296/10, 20, 24.3; 224/157, 418, 484, 319, 101, 575, 576, 224/577, 156, 581, 582; 206/16; 190/1, 11, 190/12 A, 18 A
See application file for complete search history.

(56) References Cited

U.S. PATENT DOCUMENTS

| | | | | |
|---|---|---|---|---|
| 4,147,369 A | * | 4/1979 | Simpson | 280/30 |
| 4,550,931 A | * | 11/1985 | Ziaylek, Jr. | 280/655 |
| 4,790,256 A | * | 12/1988 | Levine | 114/352 |
| 4,824,137 A | * | 4/1989 | Bolden | 280/652 |
| 5,186,479 A | * | 2/1993 | Flowers | 280/47.35 |
| 5,275,365 A | * | 1/1994 | Gerbel et al. | 248/129 |
| 5,285,936 A | * | 2/1994 | Matricardi, Jr. | 224/484 |
| 5,605,344 A | * | 2/1997 | Insalaco et al. | 280/47.34 |
| 5,609,278 A | * | 3/1997 | Fresco | 224/153 |

(Continued)

FOREIGN PATENT DOCUMENTS

| | | | | |
|---|---|---|---|---|
| DE | 3123440 A1 | * | 7/1983 | B62B 3/02 |
| FR | 2637495 A1 | * | 4/1990 | A61G 1/00 |
| GB | 2237539 A | * | 5/1991 | B62B 1/12 |

OTHER PUBLICATIONS

Raw machine translation of description of FR 2637495 A1.*

*Primary Examiner* — J. Allen Shriver, II
*Assistant Examiner* — Steve Clemmons
(74) *Attorney, Agent, or Firm* — Michael F. Krieger

(57) ABSTRACT

The present invention is directed to a multi-function cart for storing and transporting emergency or other supplies. The multi-function cart comprises two shells that can be secured together to form a transportable storage container. When separated, each shell is convertible into various configurations that can be used to sustain life during and after a disaster as well as to clean-up and rebuild after a disaster has occurred. The multi-function cart can also be used recreationally. In this manner, the multi-function cart enables victims to quickly care for themselves, and encourages victims to immediately begin the clean-up and rebuilding process. Each shell is convertible into different configurations using various tubes. Hub brackets on opposing sides of the shell include adapters to which any of the tubes can be connected. The tubes can be connected to the adapters in an upward or a downward orientation to form different configurations.

23 Claims, 19 Drawing Sheets

(56) References Cited

U.S. PATENT DOCUMENTS

| | | | |
|---|---|---|---|
| 5,653,457 A * | 8/1997 | Marmer et al. | 280/30 |
| 5,975,660 A * | 11/1999 | Tisbo et al. | 312/263 |
| 6,131,941 A * | 10/2000 | Huang | 280/651 |
| 6,152,461 A * | 11/2000 | Dunks | 280/30 |
| 6,217,042 B1 * | 4/2001 | Kurtz et al. | 280/37 |
| 6,217,043 B1 | 4/2001 | Chumely | |
| 6,241,276 B1 * | 6/2001 | Wilburn | 280/659 |
| 6,318,713 B1 * | 11/2001 | Levi | 269/139 |
| 6,938,905 B1 * | 9/2005 | Tsai | 280/47.29 |
| 7,066,485 B2 * | 6/2006 | Shapiro | 280/651 |
| 7,172,207 B2 * | 2/2007 | Henry | 280/651 |
| 7,195,255 B1 * | 3/2007 | Tsai | 280/47.29 |
| 7,331,454 B2 * | 2/2008 | Godshaw et al. | 206/373 |
| 7,513,511 B2 * | 4/2009 | Chaseateau | 280/47.27 |
| 7,818,840 B2 | 10/2010 | Barnett et al. | |
| 7,823,906 B2 * | 11/2010 | Darling, III | 280/651 |
| 7,963,530 B1 * | 6/2011 | Garcia | 280/30 |
| D662,679 S * | 6/2012 | Temme | D34/17 |
| 8,209,802 B2 * | 7/2012 | Linares | 5/625 |
| 2001/0002745 A1 * | 6/2001 | Weber | 280/62 |
| 2003/0209886 A1 | 11/2003 | Darling, III | |
| 2005/0012307 A1 * | 1/2005 | Shapiro | 280/651 |
| 2006/0119056 A1 * | 6/2006 | Olsen | 280/30 |
| 2007/0007094 A1 * | 1/2007 | Smith | 190/11 |
| 2007/0056106 A1 * | 3/2007 | Roberts | 5/620 |
| 2008/0277906 A1 * | 11/2008 | Dunne et al. | 280/659 |
| 2009/0260159 A1 * | 10/2009 | Buchanan | 5/617 |
| 2010/0032927 A1 * | 2/2010 | Gordon | 280/659 |
| 2010/0090444 A1 * | 4/2010 | Chen et al. | 280/651 |
| 2010/0108451 A1 * | 5/2010 | Pain et al. | 190/8 |
| 2010/0243012 A1 * | 9/2010 | Lindeman et al. | 135/88.02 |
| 2011/0049843 A1 * | 3/2011 | Radlow et al. | 280/651 |

* cited by examiner

MULTI-FUNCTION CART

CROSS-REFERENCE TO RELATED APPLICATIONS

This application claims priority to U.S. Provisional Patent Application No. 61/507,978, titled Mobile Adaptable Survival Container, which was filed on Jul. 14, 2011.

BACKGROUND

When a disaster occurs, whether natural or man-made, the injury and death toll often depends on how quickly emergency supplies can be delivered to the victims of the disaster. Oftentimes, victims rely on emergency responders outside the disaster zone to supply the necessary supplies. These emergency responders, in some cases, may not be able to reach many victims in a timely fashion such as when the disaster is of great magnitude or widely spread.

For example, if a large number of people are in need of emergency supplies, the supplies available within close proximity of a disaster may not be adequate to treat each victim. Similarly, even if adequate supplies exist within close proximity, it may be difficult or impossible to transport the supplies to those in need.

BRIEF SUMMARY

The present invention is directed to a multi-function cart for storing and transporting emergency or other supplies. The multi-function cart serves initially as a mobile storage container having a compact design that allows the storage container to be stored in many different locations including inside or outside the home, business, institution, church, or other buildings, and above or below ground such as on a deck or patio, in a shed, garage, or basement, etc. where it can be quickly accessed in case of an emergency.

The multi-function cart is convertible from the mobile storage container into various devices that provide functionality to sustain life during or after a disaster, and to clean-up and rebuild after a disaster has occurred. In this manner, the multi-function cart enables victims to maintain a semblance of normalcy and to quickly care for themselves, their families, classmates, coworkers, or neighbors in the event of an emergency, and further encourages victims to immediately begin the clean-up and rebuilding process after the emergency.

The multi-function cart can be used to store emergency or other supplies that are necessary or useful in an emergency situation. The multi-function cart allows these supplies to be packed into a single container having a small footprint that can be positioned in virtually any location where it will be most easily accessible in the event of an emergency. Further, the multi-function cart is portable in various ways to allow the supplies to be transported more easily.

The various devices into which the multi-function cart can be converted provide many immediately accessible tools for use during and after an emergency event to assist in sustaining life, providing relief, cleaning up, rebuilding, etc.

The multi-function cart can also be used outside of emergency situations including for commercial or recreation purposes. In short, the multi-function cart of the present invention can be used as a compact, portable storage unit for virtually any supplies, and converted into various different devices for use in many different scenarios.

In one embodiment, a multi-function cart comprises a first and a second shell. Each shell comprises a set of wheels, a plurality of tubes, and a pair of hub brackets attached on opposing sides of the shell. Each hub bracket includes a top and a bottom adapter that are each configured to allow any of the tubes to be attached thereto. Each hub bracket also has at least one hole through which a tube can be inserted.

Each pair of hub brackets is aligned on the corresponding side of the shell so that one or more tubes can be stored along the surface of the shell by inserting each tube through a corresponding hole in each hub bracket of the pair of hub brackets, and so that the first shell can be secured to the second shell when the second shell is aligned with the first shell by connecting each top adapter on the first shell to an opposing top adapter on the second shell.

In another embodiment, a multi-function cart comprises a first and a second shell, and a plurality of interchangeable tubes. Each shell has a set of wheels attached on one end, and a lip extending along a top edge of the sides.

Each shell also has a pair of hub brackets attached on opposing sides of the shell that are configured with corresponding holes for storing one or more interchangeable tubes. Each hub bracket also includes a top and a bottom adapter. Each adapter is configured to receive any of the interchangeable tubes.

Each of the hub brackets is positioned on the sides of the shell so that an opening is formed between the lip and the hub bracket into which any of the interchangeable tubes can be inserted to form a handle for the shell, and so that the first shell can be secured to the second shell when the second shell is aligned with the first shell by connecting each top adapter on the first shell to an opposing top adapter on the second shell.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
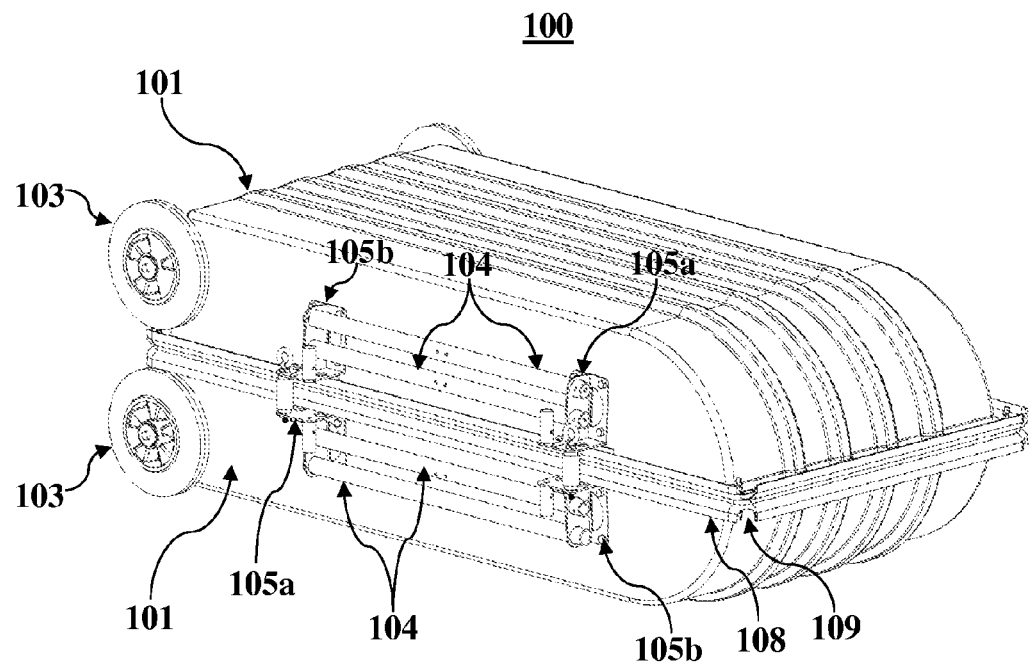
FIGS. 1A-1D illustrate a multi-function cart according to one or more embodiments of the invention.

The present invention is directed to a multi-function cart for storing and transporting emergency or other supplies. The multi-function cart serves initially as a mobile storage container having a compact design that allows the storage container to be stored in many different locations including inside or outside the home, business, institution, church, or other buildings, and above or below ground such as on a deck or patio, in a shed, garage, or basement, etc. where it can be quickly accessed in case of an emergency.

The multi-function cart is convertible from the mobile storage container into various devices that provide functionality to sustain life during or after a disaster, and to clean-up and rebuild after a disaster has occurred. In this manner, the multi-function cart enables victims to maintain a semblance of normalcy and to quickly care for themselves, their families, classmates, coworkers, or neighbors in the event of an emergency, and further encourages victims to immediately begin the clean-up and rebuilding process after the emergency.

The multi-function cart can be used to store emergency or other supplies that are necessary or useful in an emergency situation. The multi-function cart allows these supplies to be packed into a single container having a small footprint that can be positioned in virtually any location where it will be most easily accessible in the event of an emergency. Further, the multi-function cart is portable in various ways to allow the supplies to be transported more easily.

The various devices into which the multi-function cart can be converted provide many immediately accessible tools for use during and after an emergency event to assist in sustaining life, providing relief, cleaning up, rebuilding, etc.

The multi-function cart can also be used outside of emergency situations including for commercial or recreation purposes. In short, the multi-function cart of the present invention can be used as a compact, portable storage unit for virtually any supplies, and converted into various different devices for use in many different scenarios.

In one embodiment, a multi-function cart comprises a first and a second shell. Each shell comprises a set of wheels, a plurality of tubes, and a pair of hub brackets attached on opposing sides of the shell. Each hub bracket includes a top and a bottom adapter that are each configured to allow any of the tubes to be attached thereto. Each hub bracket also has at least one hole through which a tube can be inserted.

Each pair of hub brackets is aligned on the corresponding side of the shell so that one or more tubes can be stored along the surface of the shell by inserting each tube through a corresponding hole in each hub bracket of the pair of hub brackets, and so that the first shell can be secured to the second shell when the second shell is aligned with the first shell by connecting each top adapter on the first shell to an opposing top adapter on the second shell.

In another embodiment, a multi-function cart comprises a first and a second shell, and a plurality of interchangeable tubes. Each shell has a set of wheels attached on one end, and a lip extending along a top edge of the sides.

Each shell also has a pair of hub brackets attached on opposing sides of the shell that are configured with corresponding holes for storing one or more interchangeable tubes. Each hub bracket also includes a top and a bottom adapter. Each adapter is configured to receive any of the interchangeable tubes.

Each of the hub brackets is positioned on the sides of the shell so that an opening is formed between the lip and the hub bracket into which any of the interchangeable tubes can be inserted to form a handle for the shell, and so that the first shell can be secured to the second shell when the second shell is aligned with the first shell by connecting each top adapter on the first shell to an opposing top adapter on the second shell.

Figure 1B:
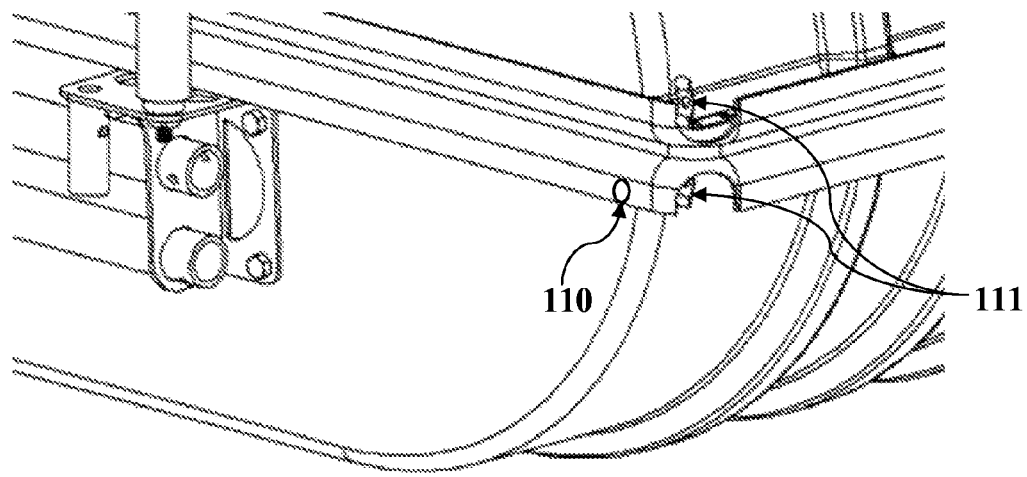

FIGS. 1A-B illustrate an exemplary multi-function cart 100 according to one or more embodiments of the invention. Multi-function cart 100 comprises two shells 101 that can be joined together in the manner shown in FIG. 1. Each of shells 101 includes a wheel assembly 103, tubes 104, and hub brackets 105a-b. Two shells 101 together form a mobile container for containing emergency or other supplies. Shell 101 can be made of plastic (e.g. polyethylene), metal, composites, or any other suitable material. In some embodiments, the materials used for shell 101 can be resistant to the elements, including UV rays and extreme ranges of heat and cold, as well as extreme forces. Shell 101 can also be manufactured with a reflective coating to increase its visibility. In some embodiments, multi-function cart 100 can include (e.g. have embedded or be connected to) one or more digital electronic devices such as intermediate frequency receiver chips, global position system devices, emergency radio receivers, etc.

Although FIG. 1 illustrates shell 101 as having a sled shape, shells of other concave shapes can also be used. The sled shape can facilitate the transport of shell 101 via dragging. In some embodiments, each of shells 101 can be identically configured (i.e. in shape, size, and components). However, in some embodiments, one shell 101 may not include wheel assembly 103, tubes 104, and/or brackets 105a-b (in which case, one shell can be configured to stack within the other shell). In some embodiments, one shell may have a different size, shape, or design than the other shell.

In some embodiments, shells 101 can be configured to allow multiple shells 101 to be stacked on top of each other individually, or to facilitate the stacking of multiple multi-function carts 100. Multi-function cart 100 can also include one or more instructions, diagrams, or photographs attached thereto which describe how to use each feature of multi-function cart 100. In some embodiments, shell 101 can include one or more drains to control the inflow/outflow of fluids. Such drains can include a removable drain plug for selectively sealing the drain.

Wheel assembly 103 comprises two wheels and an axle that extends through or otherwise attaches to shell 101. Wheel assembly 103 enables multi-function cart 100 to be easily transported, and enables the conversion of each shell 101 of multi-function cart 100 into various other devices as will be further described below.

Hub brackets 105a-b store tubes 104 while tubes 104 are not in use. Each shell 101 includes two sets of hub brackets 105a-b, one set on opposite sides of the shell. As shown, a set of hub brackets 105a-b secures two tubes 104 to shell 101. The opposite side of shell 101, which is not shown in FIG. 1, is likewise configured with a set of hub brackets 105a-b that secures two tubes 104. In the remainder of the description, the hub brackets may be referred to generally as hub brackets 105. Although hub brackets 105 shown in the Figures are configured to secure two tubes 104, hub brackets 105 could be configured to store one or more tubes in some embodiments.

Figures 2A, 2B:
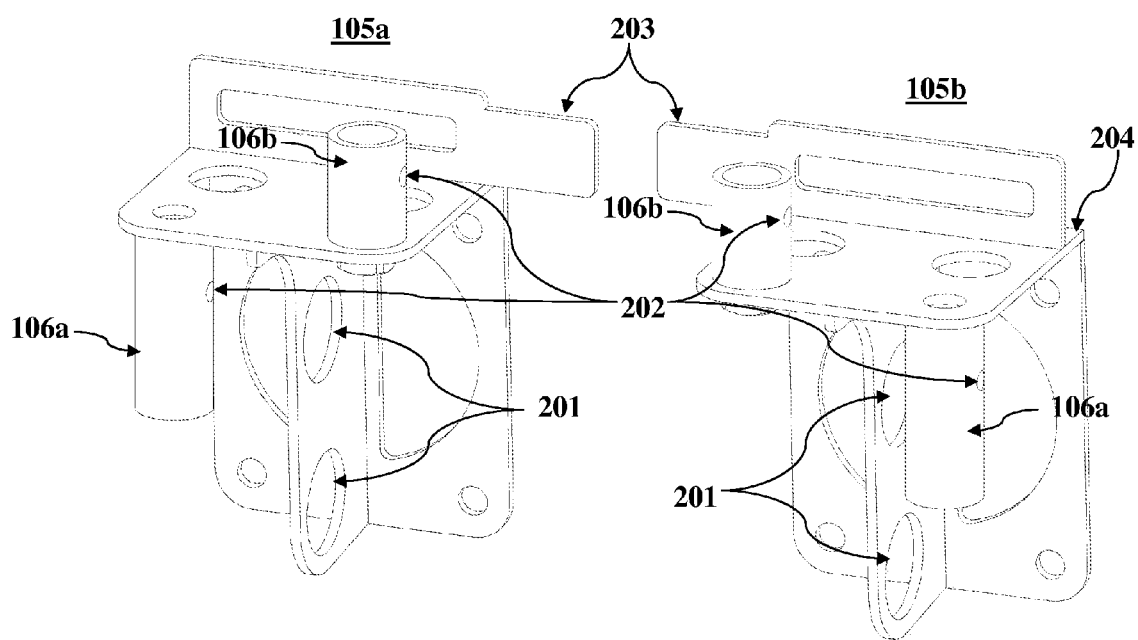
FIGS. 2A-2C illustrate exemplary hub brackets that are attached to the multi-function cart of FIG. 1.

Each hub bracket 105 includes adapters 106a-b as shown in FIGS. 2A-2B. In the remainder of the description, adapters 106*a-b* may be referred to generally as adapters 106. In some embodiments, adapters 106*a-b* are integrated into hub brackets 105 (e.g. as a single molded part, or by welding). In other embodiments, adapters 106*a-b* are separate and removable from hub brackets 105. Adapters 106*a-b* can be used to attach tubes 104 to hub brackets 105 in various configurations as will be further described below.

Each of tubes 104 can be of the same diameter and length to allow interchangeable use of tubes 104 in the various configurations described below. Each of tubes 104 includes various holes for attaching the tubes to various components using a pin (or other type of connector) in these various configurations.

Shell 101 further includes a lip 108 along the top of the sides. Lip 108 comprises a curved protrusion of shell 101 along the top edge as is shown in FIG. 1. Lip 108 can be formed along all of the sides of shell 101 as shown in FIG. 1, or alternatively, could be formed along only two opposing sides of shell 101.

Each lip 108 includes an opening 109 on one or both ends through which a tube 104 can be inserted to form a handle as will be further described below. Accordingly, a handle can be formed using any of tubes 104, in a similar manner, at all four lip corners of shell 101. FIG. 1A calls out a single opening 109 for sake of clarity; however, a similar opening can be formed at each lip corner of each shell.

In some embodiments, lip 108 can be configured to provide an air and water tight seal when two shells 101 are joined together as shown in FIG. 1. For example, one or both of shells 101 can be formed as or include a gasket or other type of seal along lip 108 to provide a seal between lips 108 when shells 101 are joined.

In some embodiments, shells 101 can be joined by a hinge along one side. The hinge allows the shells to be pivoted along the hinged side similar to a clamshell. The hinge can be removable to allow the complete detachment of each shell 101.

In some embodiments, one or more of shells 101 can include connection points, such as holes, grommets, rivets, cutouts, pins, bars, inserts, etc. to which straps, ropes, handles, harnesses, chains, webbing, etc. can be connected to assist with transporting multi-function cart 100 or individual shells 101 (e.g. by human or mechanical power). The connection points could also be used to link together multiple shells 101 to form a large shelter. Such connection points can also be used to store multi-function cart 100. For example, the connection points can be used to mount multi-function cart 100 under an eave of a house, under the ceiling of a garage, on the side of a shed, along the rail of a ship, on the top of a car, etc.

Hub brackets 105 are attached to shell 101 so that the spacing between the hub brackets and lip 108 are sufficient to receive tubes 104 when inserted through openings 109. For example, as shown in FIGS. 2A-2B, when the hub bracket is attached to shell 101, portions 203 and 204 (only visible on hub bracket 105*b*) of the hub bracket form an opening between the hub bracket and lip 108 into which tubes 104 can be inserted. Portions 203 and 204 and lip 108 prevent tubes 104 from moving outwardly away from shell 101, or upwardly or downwardly along the exterior of shell 101, thus providing great strength to tubes 104 when used as handles as further described below.

A pin (not shown), or another type of connector, may be used to secure the position of tubes 104 when inserted into the opening formed between hub bracket 105 and lip 108. For example, as shown in FIG. 1B, lip 108 may include a hole 110 near opening 109 through which the pin is inserted (each corner of lips 108 can have a similar hole). A corresponding receptacle 111 for the pin may be attached to or formed within shell 101. Tubes 104 may also include corresponding holes so that the pin can extend through hole 110 and tube 104 and into receptacle 111 to further secure tube 104 when used as a handle.

Figure 1C:
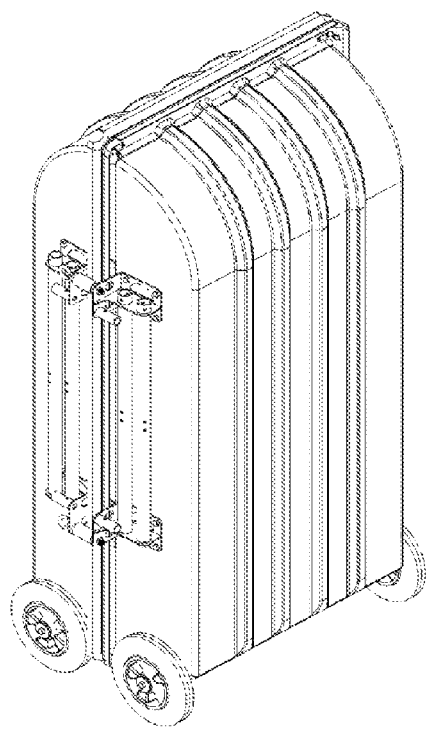

FIG. 1C illustrates multi-function cart 100 in an upright position. In the upright position, wheel assemblies 103 of each shell 101 enable multi-function cart 100 to be wheeled. In this manner, multi-function cart 100 can be easily moved and stored above or below ground even in locations where minimal space is available. In embodiments where only one shell 101 includes wheel assembly 103, the other shell 101 can include a balancing block to allow multi-function cart 100 to be placed in the upright position.

Figure 1D:
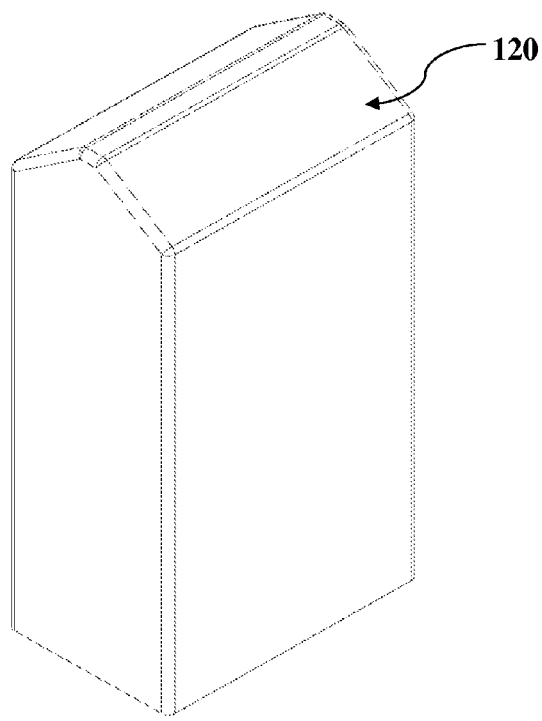

FIG. 1D illustrates multi-function cart 100 with the addition of a cover 120. Cover 120 can be used to protect multi-function cart 100 during storage such as when multi-function cart 100 is stored outside. Cover 120 can also be used to give multi-function cart 100 a pleasing appearance while stored. Cover 120 can also include emergency information, instructions, directions, phone numbers, etc.

FIGS. 2A and 2B illustrate hub brackets 105*a* and 105*b* respectively. Each of hub brackets 105*a* and 105*b* includes one or more holes 201 through which tubes 104 can be inserted to store tubes 104 when not in use. Tubes 104 can be maintained within holes 201 by inserting pins through holes on both ends of tubes 104 thus preventing the end from sliding out through hole 201. Adapters 106 are shown as including holes 202 for receiving a pin or other connector for securing tubes 104 to adapters 106. Of course, other means may be used to connect tubes 104 to adapters 106. However, by using pins that extend through tubes 104, the same holes and pins can be used to attach tubes 104 to shell 101 as handles, to attach tubes 104 to any of adapters 106, to secure tubes 104 within hub brackets 105 for storage, etc.

Figure 2C:
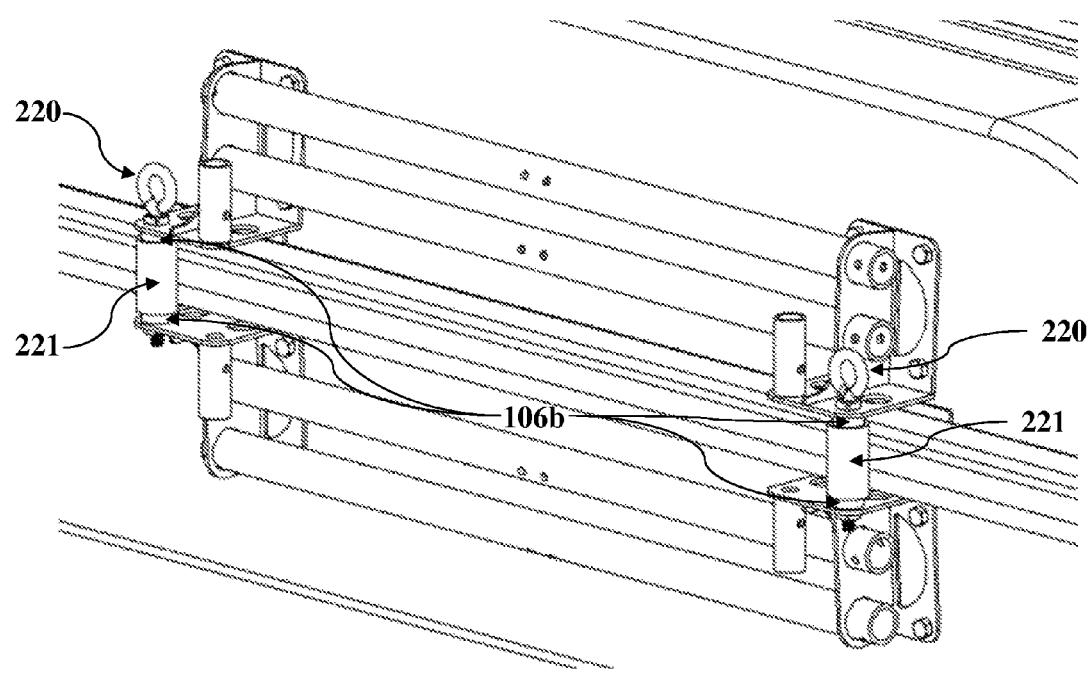

FIG. 2C illustrates how adapters 106*b* are used to connect one shell 101 to another shell 101. Hub brackets 105 are positioned on shell 101 so that when one shell is aligned with another shell, the hub brackets on both shells 101 are also aligned to allow a connector 220 to be used between a set of opposing adapters 106*b* as shown to secure the two shells together. In some embodiments, connector 220 can be an eyebolt that threads into each of the opposed adapters 106*b*. However, other types of connectors 220 can be used to secure two adapters 106*b* together. Also, in some embodiments, a support tube 221 can be placed over top of a set of the aligned adapters 106*b* as shown to provide additional support for securing the two shells together. In some embodiments, locking means can be used to lock together two shells 101.

Figure 3A:
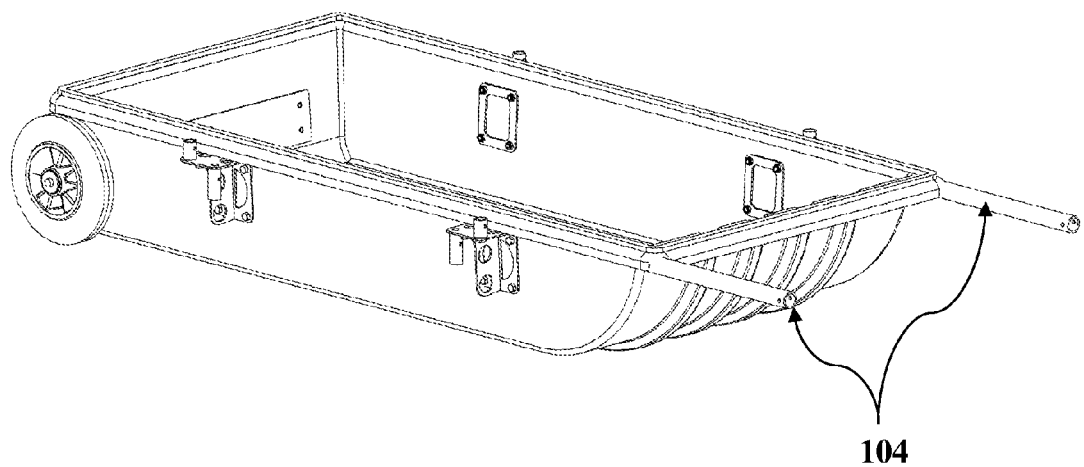
FIGS. 3A-3D illustrate various tube configurations for converting the multi-function cart into various devices.

FIG. 3A illustrates shell 101 when converted into a wheeled cart 301. As shown, to convert shell 101 into wheeled cart 301, two tubes 104 are connected to shell 101 to form handles by inserting the tubes into opening 109 and through the opening formed between the hub brackets and lip 108. The tubes can be held in place using a pin as described above with respect to FIG. 1B.

Figure 3B:
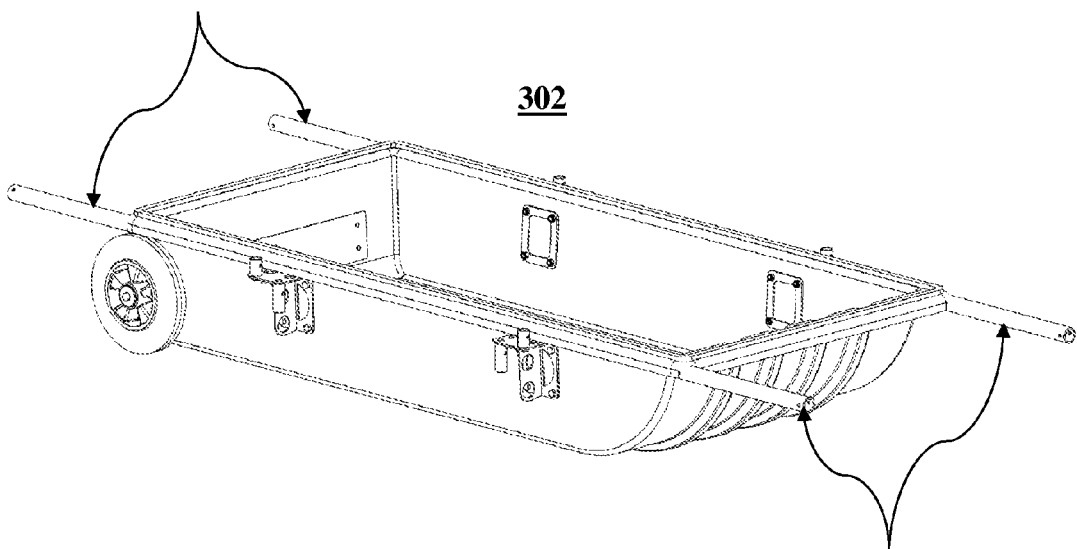

FIG. 3B illustrates shell 101 when converted into a two-person carrier 302. Two-person carrier 302 is similar to wheeled cart 301 with the addition of two additional tubes 104 as shown. These two additional tubes 104 are connected to the opposite end of the shell 101 in the same manner as described above thus providing handles on opposite ends of shell 101 to allow two people to carry carrier 302 with any contents. Two-person carrier 302 can be used to carry any type of material, object, or even people (i.e. two-person carrier 302 can serve as a stretcher for transporting victims).

Figure 3C:
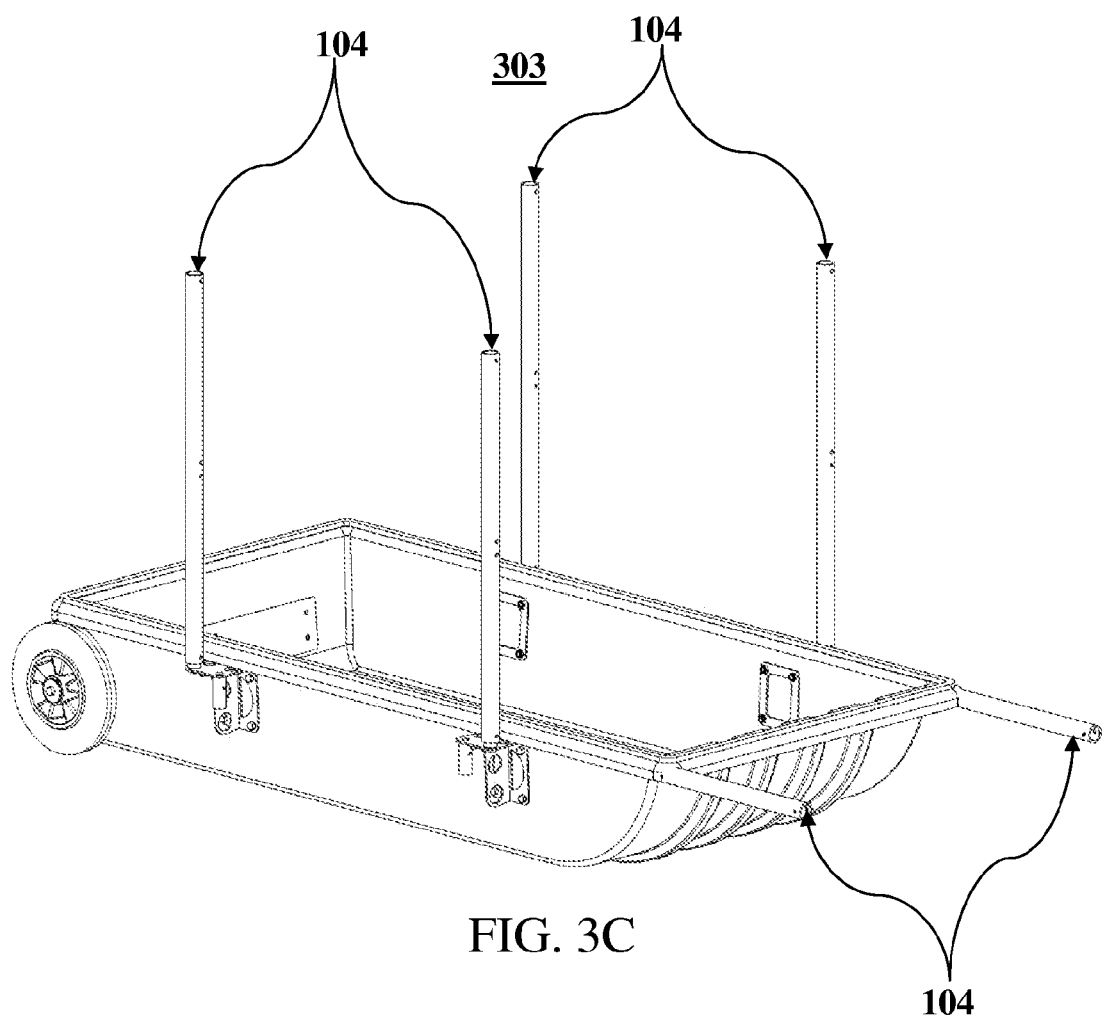

FIG. 3C illustrates shell 101 when converted into a stake-side bulk carrier 303. Stake-side bulk carrier 303 is similar to wheeled carrier 301 with the addition of four tubes 104 that are connected to adapters 106b (e.g. using a pin or other type of connector, or alternatively, using no connector) in a vertical position/orientation. In this configuration, tubes 104 provide support for maintaining bulk items within bulk carrier 303 during transport. The two additional tubes 104 used to convert shell 101 into stake-side bulk carrier 303 can be stored inside shell 101, and may be included in the emergency supplies initially contained within multi-function cart 100. The two additional tubes can also be obtained from the other shell 101 of multi-function cart 100. Also, in embodiments where hub brackets 105 are configured to store three tubes (e.g. when hub brackets 105 contain three holes 201), all six tubes used for stake-side bulk carrier 303 can be stored within hub brackets 105.

Figure 3D:
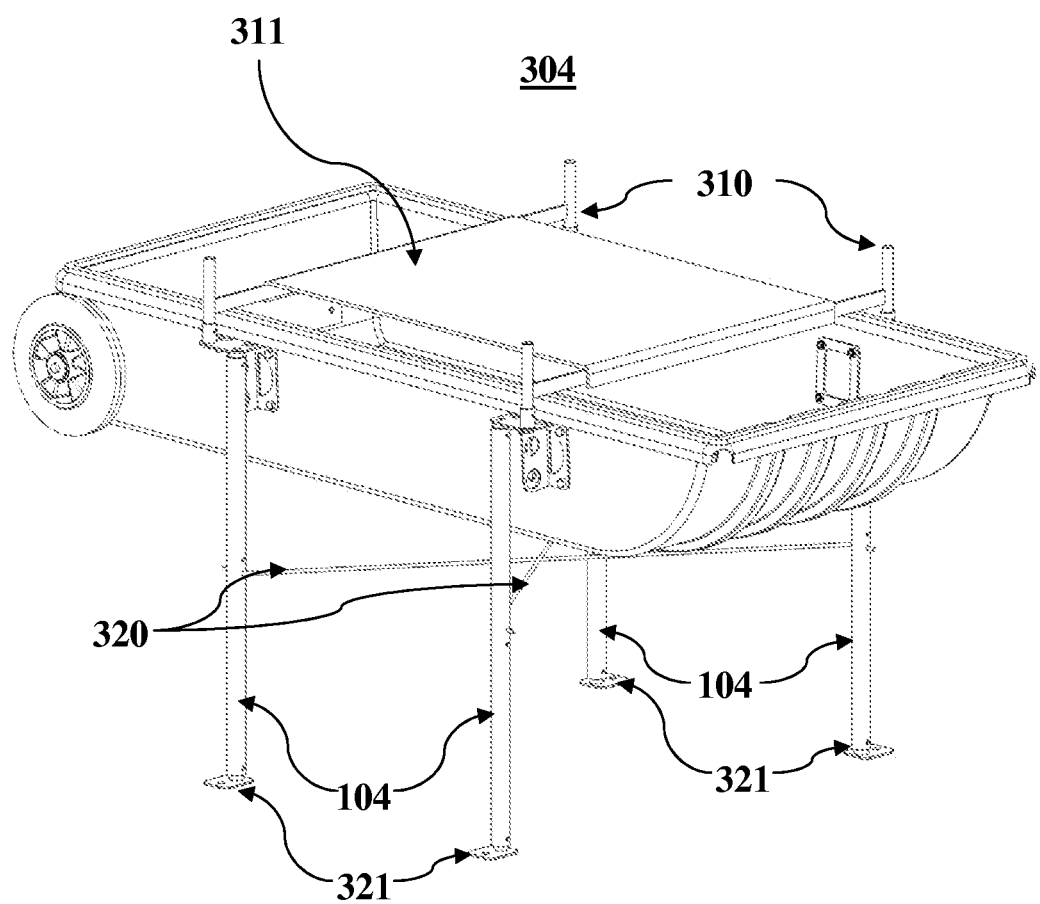

FIG. 3D illustrates shell 101 when converted into an elevated work area 304. To form elevated work area 304, tubes 104 are connected to adapters 106a (e.g. using a pin or other type of connector, or alternatively, using no connector) in a vertical downward position as shown. To form a table or elevated work surface, shell support bars 310 can be attached to adapters 106b, and surface 311 can be placed on, or otherwise connected to, shell support bars 310 as shown in FIG. 3D. Surface 311 can also attach directly to shell 101 without using shell support bars 310. When surface 311 is not attached, elevated work area 304 forms an open basin. When surface 311 is attached, elevated work area 304 forms a partially covered basin.

Shell support bars 310 provide rigidity to shell 101 when used in these configurations. For example, when loaded, the sides of shell 101 will tend to flex. Shell support bars 310 provide added strength and rigidity to shell 101 to enable shell 101 to hold its shape and a large amount of weight. Although shell support bars 310 are only shown being used in the elevated work area 304 configuration, they could be used in any of the disclosed configurations of shell 101 as desired to provide greater support to shell 101.

Each shell support bar 310 is comprised of a horizontal bar that extends between two vertical legs. The legs on either end of shell support bar 310 can have a cylindrical shape to allow the legs to be connected to adapters 106b. As shown in FIG. 3D, the legs of shell support bar 310 have an outer diameter that is small enough to allow the cylinders to be inserted into adapters 106b on either side of shell 101.

The horizontal bar of shell support bar 310 can be configured in different forms. In the Figures, the horizontal bar is shown as being straight thus giving the shell support bar a general H shape. However, in other embodiments, the horizontal bar can be in the form of a U that follows the inside contour of shell 101 when shell support bar 310 is attached to adapters 106b. Alternatively, a U shaped shell support bar 310 can be designed to follow the outside contour of shell 101 (i.e. along the outer top edge of shell 101). Such designs are particularly useful when shell 101 is used as a cart, carrier, or basin, as it makes the entire shell open and accessible.

To provide greater stability, leg support bars 320 and feet 321 can be attached to tubes 104 as shown. Feet 321 are designed to provide greater surface area to tubes 104 so that tubes 104 do not sink into the ground when shell 101 is loaded. Feet 321 can also have holes to allow the feet to be staked into the ground. Shell support bars 310, surface 311, leg support bars 320, and feet 321 can be contained within multi-function cart 100 when multi-function cart 100 is not configured as elevated work area 304.

Although not shown in the figures, an elevated work area can also be created by attaching tubes 104 to adapters 106b and inverting shell 101 so that the bottom of shell 101 forms a generally flat surface for the elevated work area. This configuration can also be used as a shelter. A lean-to type shelter could also be formed by using only two tubes 104 on one end of shell 101 in this configuration thus allowing the other end of shell 101 to rest on the ground.

Figure 4A:
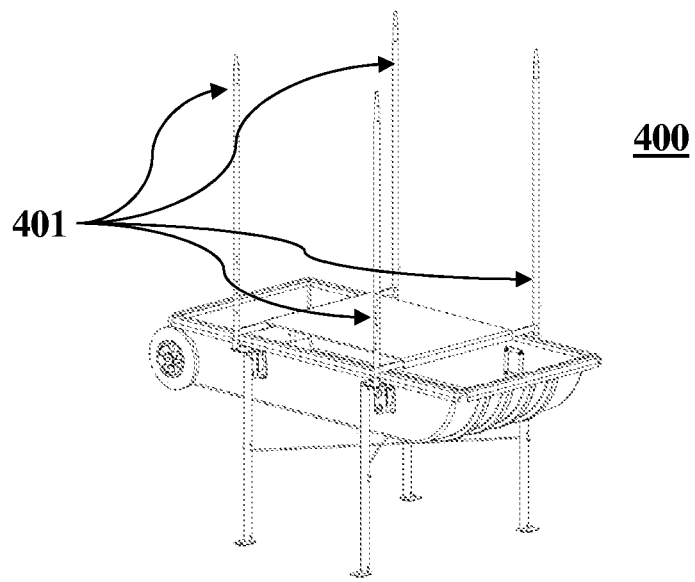
FIGS. 4A-4D illustrate a configuration of the multi-function cart as a covered work area.
Figure 4B:
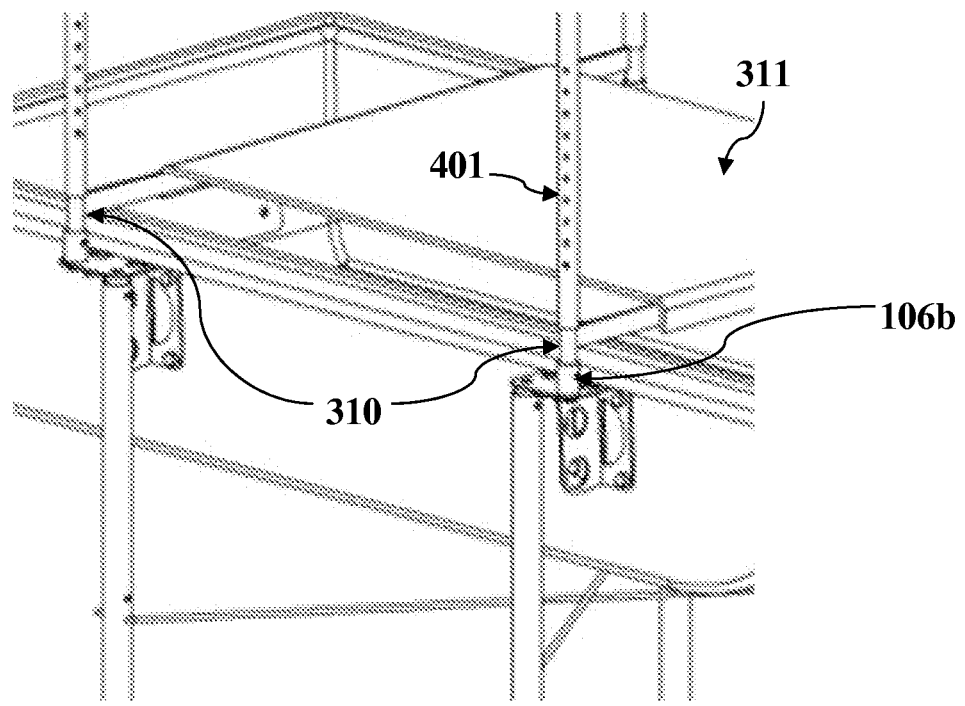

FIGS. 4A-4D illustrate elevated work area 304 with the addition of a canopy assembly 400. Canopy assembly 400 can be contained within multi-function cart 100 or otherwise made available. Canopy assembly 400 can comprise telescoping tubes 401, canopy 402, ropes 403-404, and shell support bars 310. To form canopy assembly 400, as shown in FIG. 4A-4D, telescoping tubes 401 are attached to shell support bars 310 (which are attached to adapters 106b) to form supports for canopy 402 as shown. Telescoping tubes 401 can be sized to fit over top of the vertical portion of shell support bars 310 as shown in FIG. 4B.

Figure 4C:
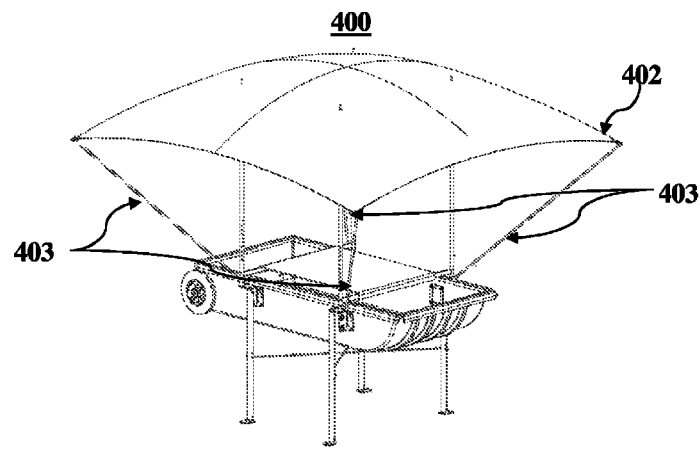

Telescoping tubes 401 can be extended to allow canopy 402 to be positioned at various heights. The top of each of telescoping tubes 401 can be tapered to conform to a corresponding hole in canopy 402 so that a portion of each telescoping tube extends through canopy 402 as shown in FIG. 4C.

Figure 4D:
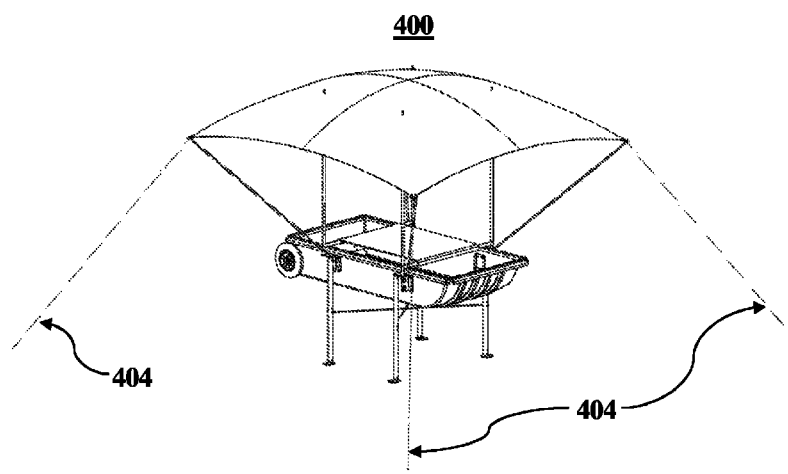

Canopy 402 can include various loops or rings to allow canopy 402 to be tied down to shell 101 or to the ground. FIG. 4C shows each corner of canopy 402 being tied down to shell 101 using ropes 403. Of course, other materials other than rope could be used to tie down canopy 402 (e.g. bungee cords). Similarly, FIG. 4D shows each corner of canopy 402 being tied down to the ground using ropes 404.

Figure 5A:
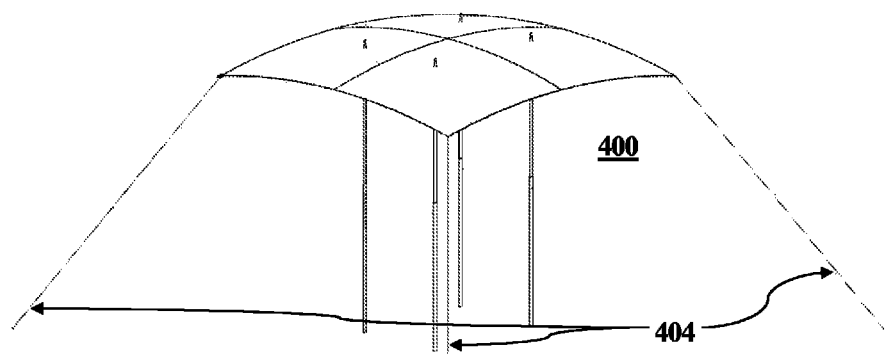
FIGS. 5A-5B illustrate a canopy that can be configured using a canopy assembly stored within the multi-function cart.
Figure 5B:
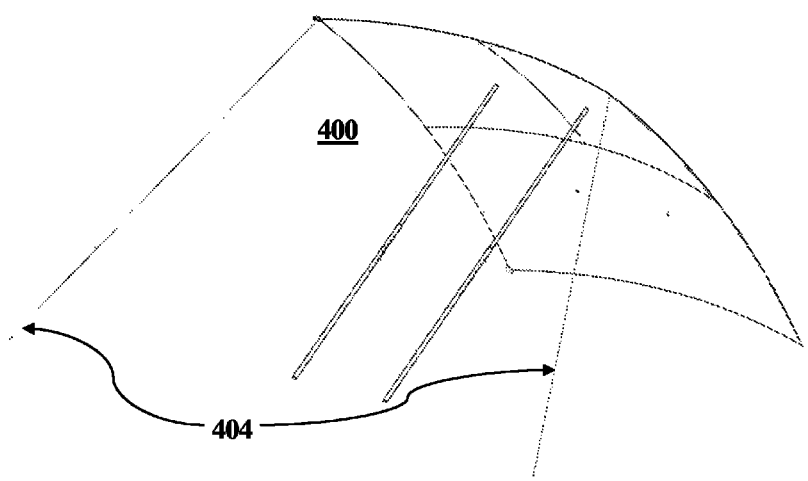

FIGS. 5A-5B illustrate canopy assembly 400 as a stand-alone unit. In some embodiments of the invention, canopy assembly 400 can be formed separately from shell 101. In FIG. 5A, canopy assembly 400 is shown in a generally upright position. In this configuration, telescoping tubes 401 have been extended, and ropes 404 are shown tying down canopy 402 to the ground. Canopy assembly 400 can also be used in an angled configuration as is shown in FIG. 5B. In this configuration, two telescoping tubes 401 are used thus allowing canopy 402 to tilt down to the ground. To secure canopy 402 in this configuration, the elevated corners of canopy 402 are tied down using ropes 404.

FIGS. 6A-6H illustrate shell 101 when converted into a cart 600. Cart 600 is formed using tubes 104 in conjunction with forks 601 and yoke bracket 603. Forks 601 are similar to standard bicycle forks, but are configured on the top end to connect to adapters 106a in the same manner as tubes 104 connect to adapters 106a. Additionally, each of forks 601 contains multiple notches 602 for receiving a bicycle wheel axle. Notches 602 are spaced vertically along forks 601 to allow different sized wheels to be used including allowing a different sized wheel to be used on each side of cart 600.

A first set of tubes 104 are connected to adapters 106 to form legs for cart 600. Another set of tubes 104 (labeled 104a and 104b) are attached to shell 101 as handles. Yoke bracket 603 is connected between tubes 104a and 104b to form a handle for pushing or pulling cart 600. Cart 600 can be configured with or without canopy assembly 400, shell support bars 310, yoke bracket 603, and surface 311 as represented in FIGS. 6A-6H.

Figure 6A:
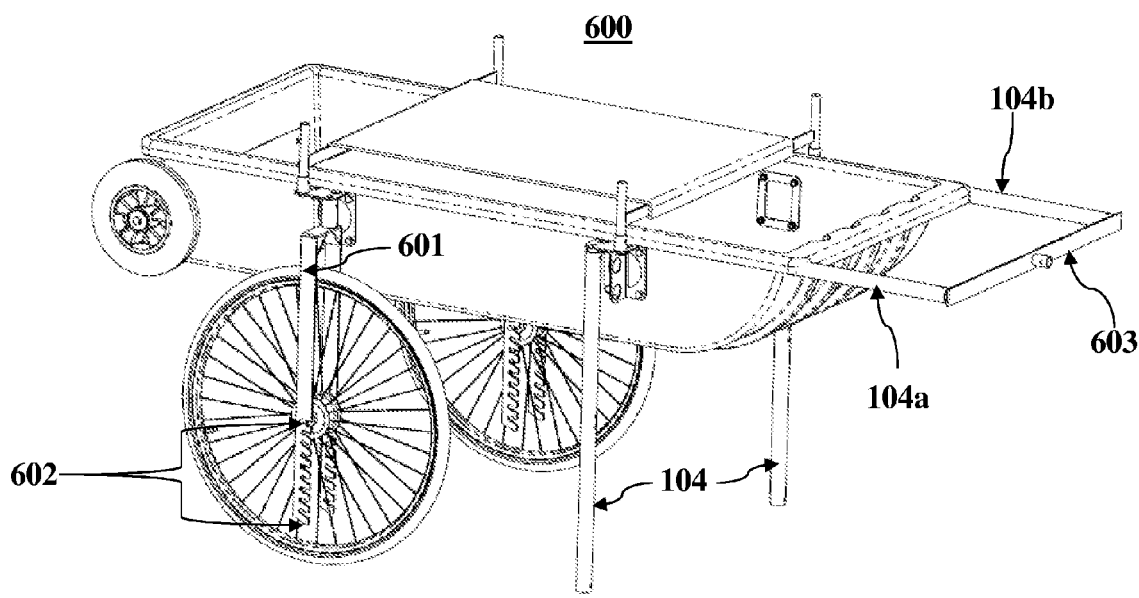
FIGS. 6A-6H illustrate various configurations of the multi-function cart as a cart or trailer.
Figure 6B:
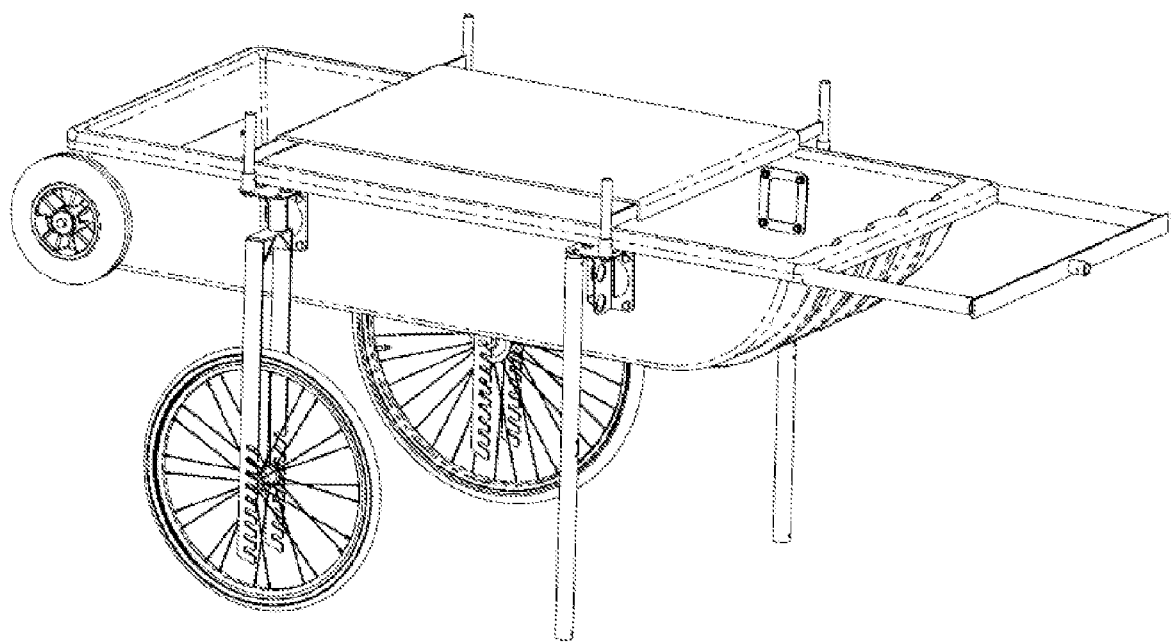
Figure 6C:
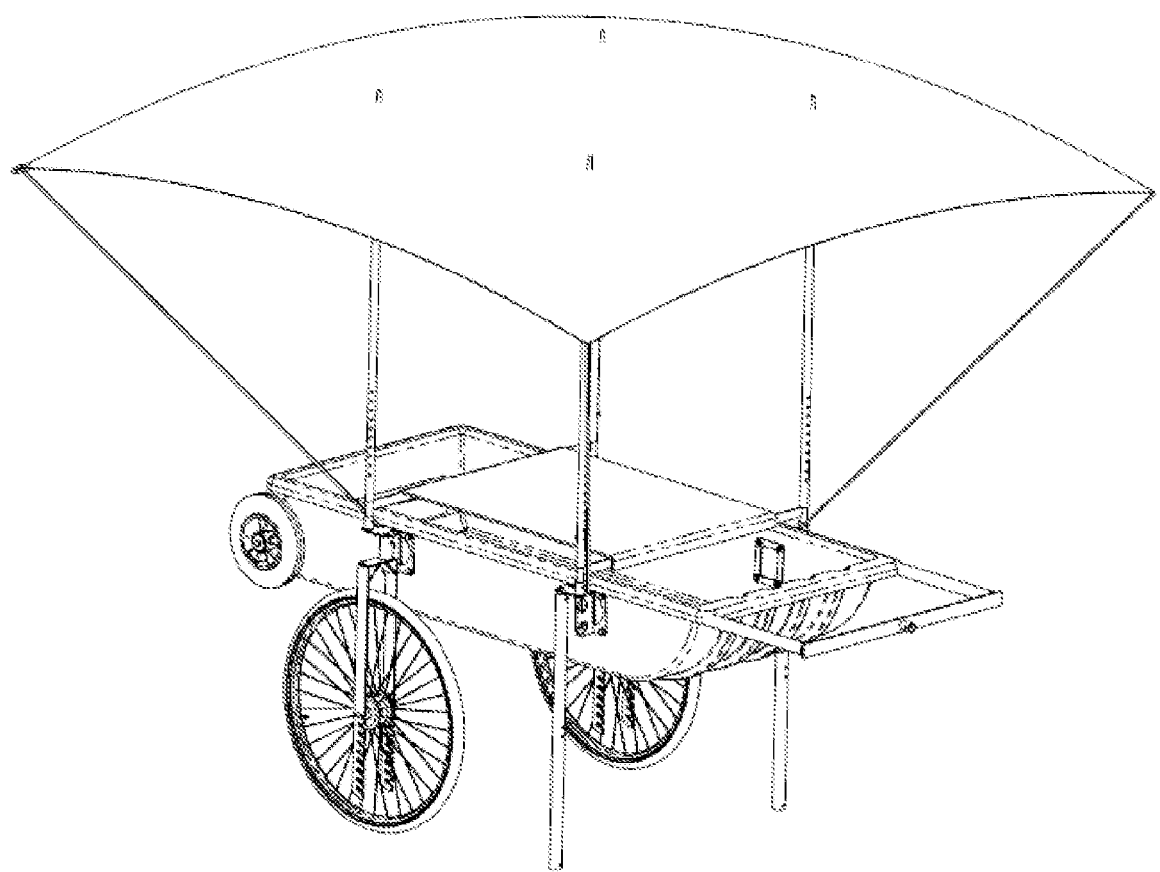
Figure 6D:
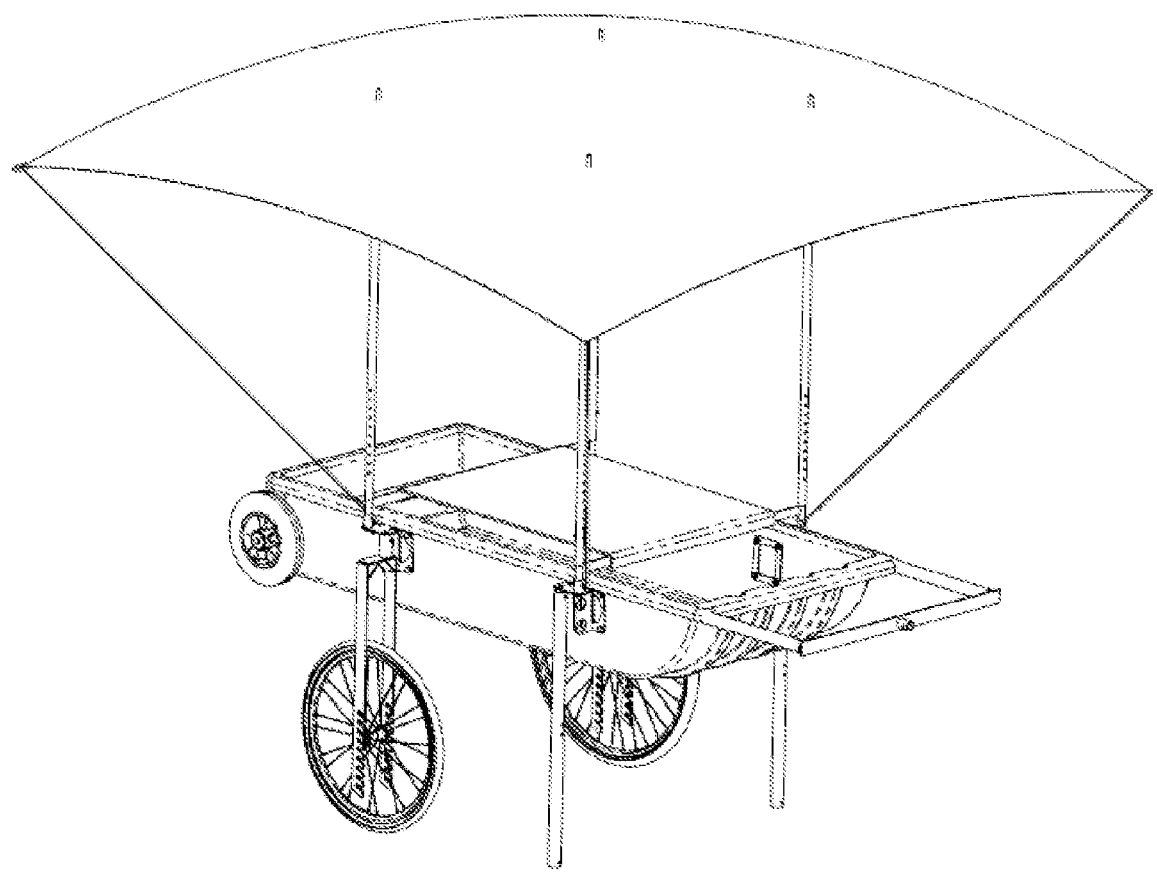

FIGS. 6B and 6D illustrate how notches 602 enable wheels of different sizes to be used. For example, two wheels of the same size may not be available in all situations. Cart 600 accordingly can be used with virtually any two wheels by positioning each wheel in the appropriate notch 602 so that cart 600 is level.

Figure 6E:
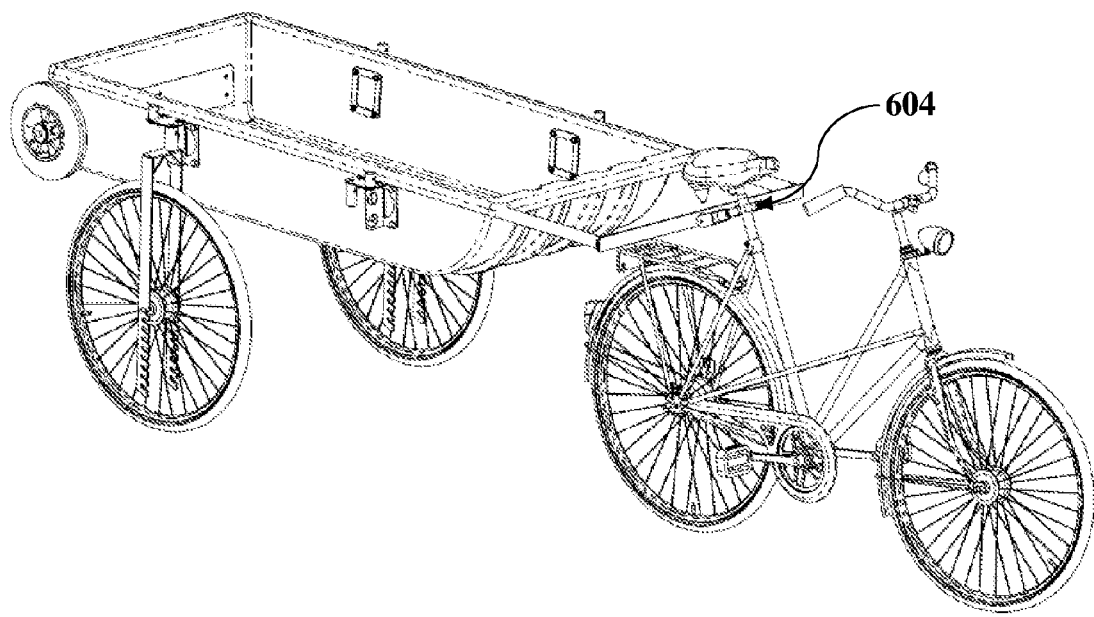
Figure 6F:
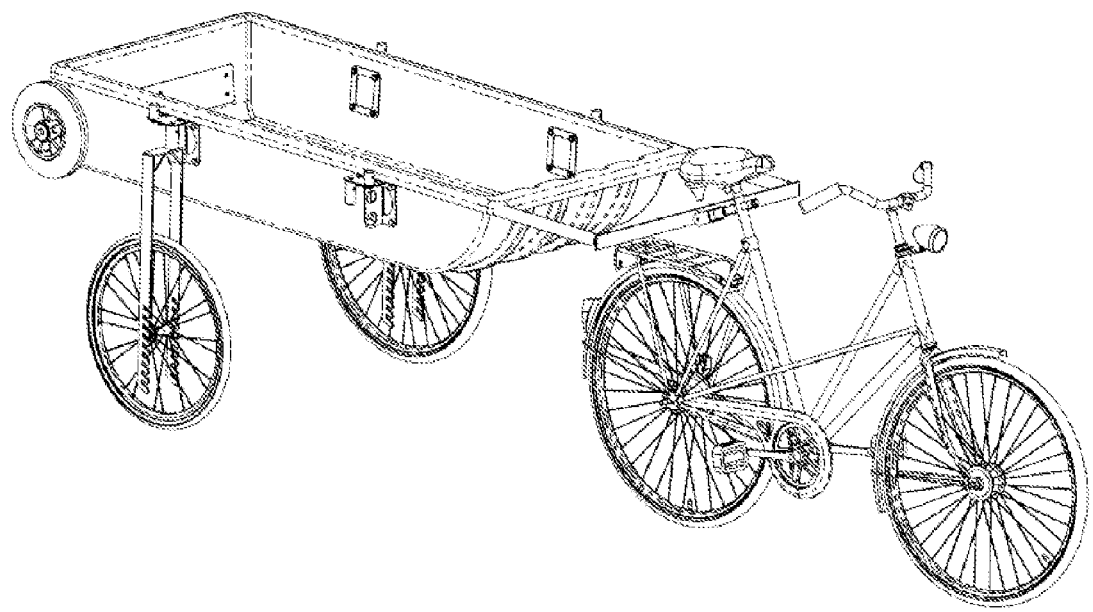
Figure 6G:
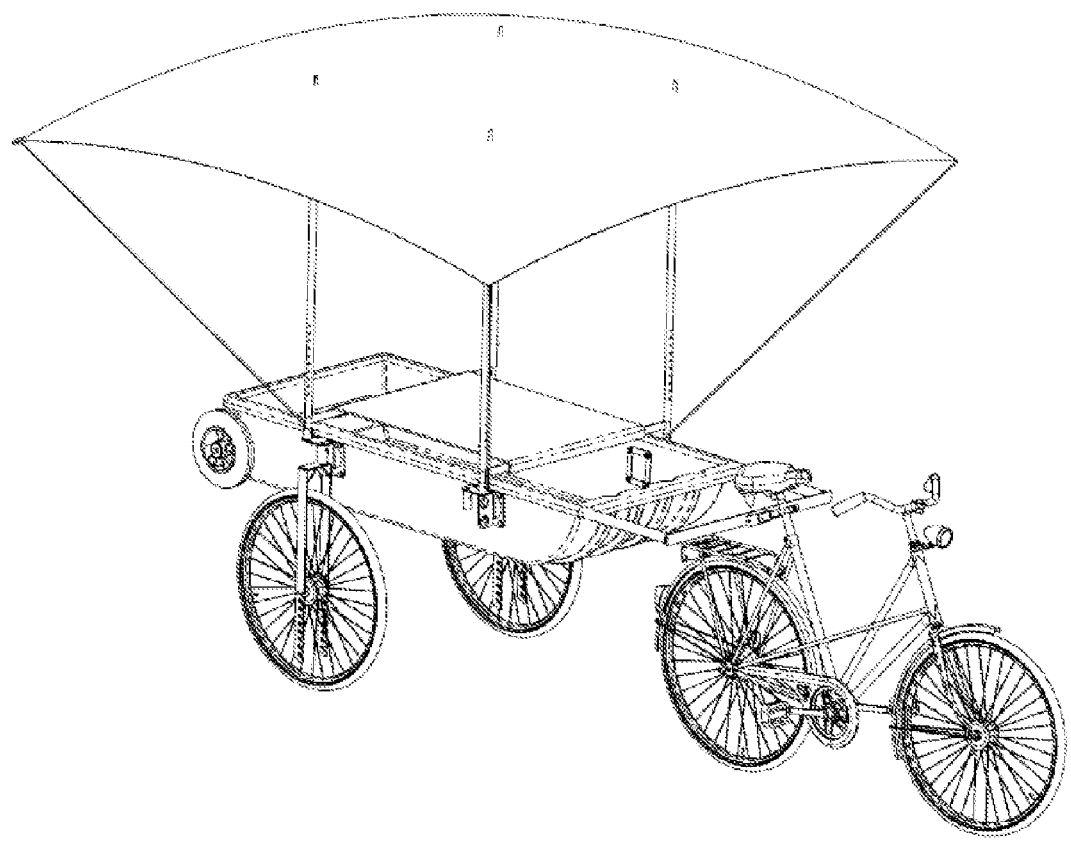
Figure 7A:
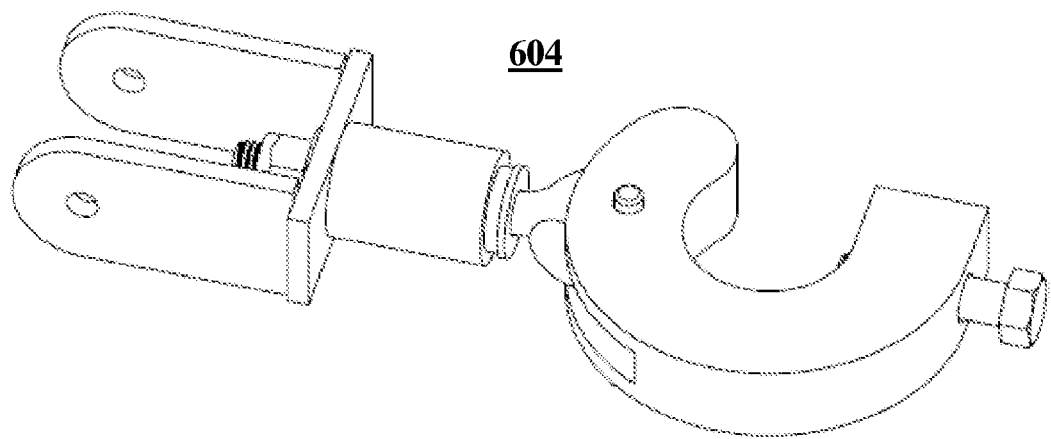
FIGS. 7A-7B illustrate a universal adapter for connecting the multi-function cart to a bicycle or vehicle as a trailer.
Figure 7B:
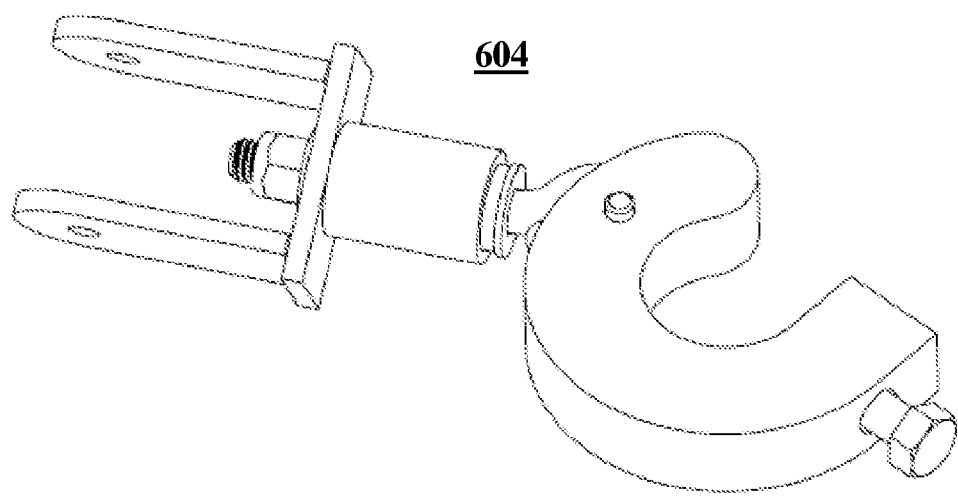

Cart 600 can be converted into a trailer using a universal adapter 604 (identified in FIG. 6E) as shown in FIGS. 6E-6G. Universal adapter 604, which is shown in more detail in FIGS. 7A-7B, is configured to connect to yoke bracket 603 and includes swivel joints to allow swiveling in vertical, horizontal, and rotational directions. Universal adapter 604 can be connected to a bicycle as shown in FIGS. 6E-6G or to another vehicle to allow cart 600 to be towed as a trailer. In some embodiments, braking means can be provided with cart 600. For example, forks 601 can be configured with brakes to apply braking to cart 600.

Figure 6H:
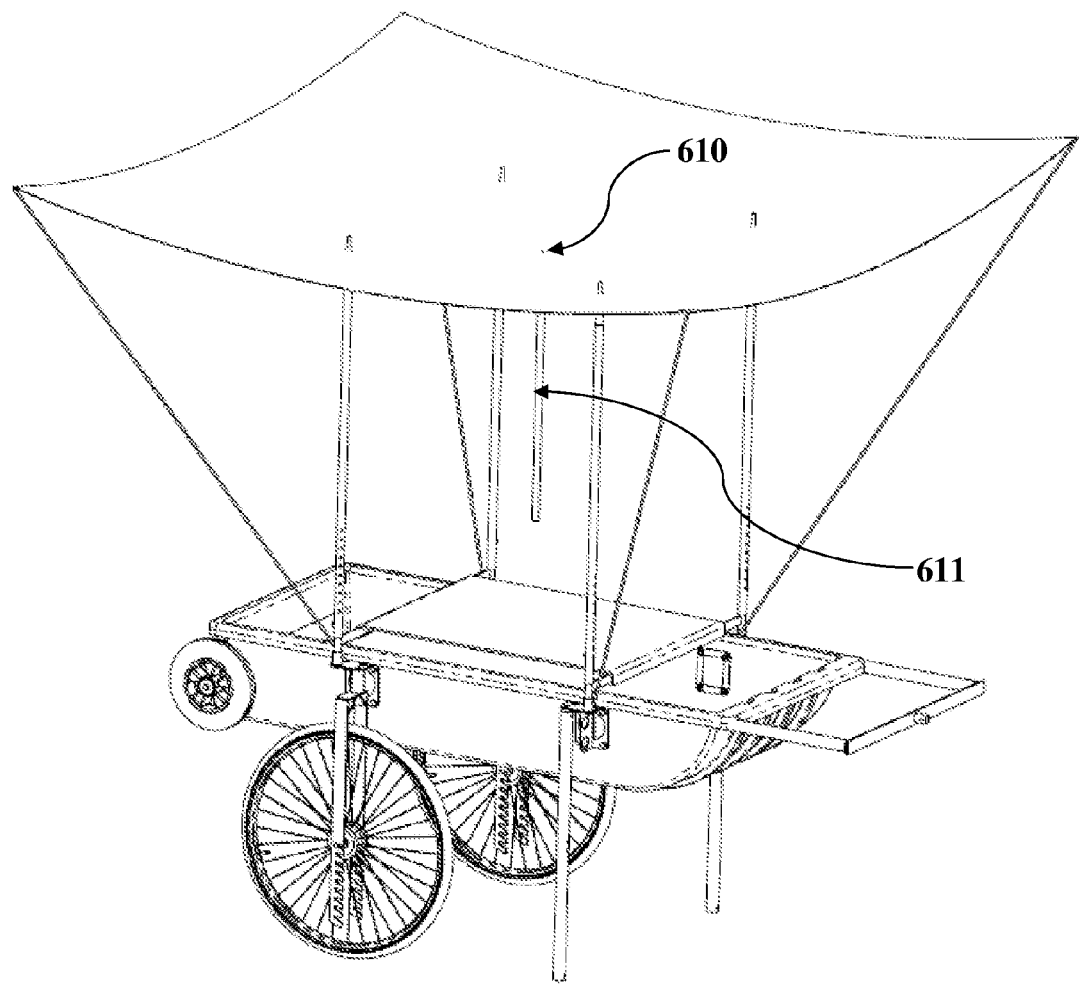

In some embodiments, canopy 402 can include an opening in or around the center. In such embodiments, canopy 402 can be used to collect water (e.g. rain water) by inverting canopy 402. For example, FIG. 6H illustrates canopy 402 being inverted on cart 600. Opening 610 in canopy 402 can include a valve, plug, or other means to selectively seal the opening to facilitate the draining of collected water from canopy 402 into another container. In some embodiments, a hose 611 can be attached to the opening to facilitate such draining.

Multi-function cart 100 can be used to store and transport virtually any supplies. In some embodiments, in addition to the components described above, multi-function cart 100 can include emergency supplies, cooking supplies, toiletries, and other common supplies for an emergency or 72 hour kit for an individual, a family, a business, a school or other institution, a church, or a building. To facilitate the storage of items, multi-function cart 100 can include one or more internal dividers or compartments. The dividers can be formed of any suitable material, and can be integrated, removable, interchangeable, segregable, reconfigurable, upgradable, etc. The supplies can be stored within multi-function cart 100 using various numbers of custom bags or packs that are sized and shaped to fit within multi-function cart 100 (e.g. within specific compartments).

A multi-function cart 100 containing such contents can be purchased, supplied, or otherwise distributed to serve as a single unit storing essential emergency supplies which can be converted into the various configurations as described above to assist in sustaining life, providing relief, or cleaning up when an emergency occurs.

Additionally, because multi-function cart 100 can comprise two identical shells 101, multi-function cart 100 can provide two emergency units or kits (i.e. two sets of supplies can be included within multi-function cart 100). Accordingly, when an emergency occurs, multi-function cart 100 can be divided into two shells 101, whether the shells are of the same size, shape, material, etc., to support two families or groups in an emergency or other situation.

Further, multi-function cart 100 can also be used in non-emergency scenarios. In short, because of its compact and portable design, multi-function cart 100 can be used as a storage unit for virtually any supplies, and converted into various different devices for use in many different scenarios. For example, a mobile merchant can use multi-function cart 100 to conveniently store, transport, and display his or her goods.

Similarly, multi-function cart 100 can be used recreationally. For example, multi-function cart 100 can be easily transported (e.g. in the back of a truck, or secured to the top of a vehicle) for use while camping. After arriving near a campsite, multi-function cart 100 can be converted into wheeled cart 301 or carrier 302 or 303 for transport to the campsite. Further, multi-function cart 100 can be converted into elevated work area 304 at the campsite to provide an area for cooking, cleaning, etc. while using canopy assembly 400 to provide shade or cover either with elevated work area 304 or as a stand-alone unit. Canopy assembly 400 could also be used to collect rain water as shown in FIG. 6H.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A multi-function cart comprising:
a first and a second shell, wherein each shell comprises:
a first side;
a second side opposing the first side;
a lip extending along a top edge of the first and second sides;
a set of wheels;
a plurality of tubes; and
a first pair of hub brackets attached on the first side of the shell and a second pair of hub brackets attached on the second side of the shell, each of the hub brackets being positioned on the sides of the shell so that an opening is formed between the lip and the hub bracket into which an of the interchangeable tubes can be inserted to form a handle for the shell, each hub bracket including a top and a bottom adapter that are each configured to allow any of the tubes to be attached thereto, each hub bracket also having at least one hole through which a tube can be inserted, each pair of hub brackets being aligned on the corresponding side of the shell so that one or more tubes can be stored along the surface of the shell by inserting each tube through a corresponding hole in each hub bracket of the pair of hub brackets, and so that the first shell can be secured to the second shell when the second shell is aligned with the first shell by connecting each top adapter on the first shell to an opposing top adapter on the second shell.

2. The multi-function cart of claim 1, wherein each of the adapters and the tubes include corresponding holes through which a connector may be inserted to connect a tube to an adapter.

3. The multi-function cart of claim 1, wherein the lip includes a hole proximate each corner of the shell for securing the tubes to the lip by inserting a connector through each lip and a corresponding tube when the tubes are used as handles.

4. The multi-function cart of claim 1, wherein two tubes are attachable as handles on the end of the shell opposite the set of wheels to form a wheeled cart.

5. The multi-function cart of claim 1, wherein a tube is attachable as a handle at each corner of the shell to form a two-person carrier.

6. The multi-function cart of claim 1, wherein two tubes are attachable as handles on the end of the shell opposite the set of wheels, and tubes are attachable in an upward position to each of the top adapters to form a bulk carrier.

7. The multi-function cart of claim 1, wherein tubes are attachable in a downward position to each of the bottom adapters to form an elevated basin, and are attachable in a downward position to each of the top adapters when the shell is inverted to form an elevated work area.

8. The multi-function cart of claim 7, further comprising leg support bars that are attachable between a pair of tubes of the elevated work area or basin.

9. The multi-function cart of claim 7, further comprising shell support bars, wherein each shell support bar is configured to attach between top adapters on opposing sides of the shell.

10. The multi-function cart of claim 9, further comprising a surface that is configured to be placed on top of the lip of the shell or on top of the shell support bars to provide a table or elevated work area.

11. The multi-function cart of claim 9, further comprising a canopy assembly, the canopy assembly comprising telescoping tubes and a canopy, wherein the telescoping tubes are attachable in an upward position to the shell support bars to form supports for the canopy.

12. The multi-function cart of claim 11, wherein one end of the telescoping tubes is tapered, and wherein the canopy includes holes through which the tapered ends of the telescoping tubes are inserted.

13. The multi-function cart of claim 11, wherein the canopy includes an opening for draining water collected in the canopy when the canopy is used in an inverted configuration.

14. The multi-function cart of claim 11, wherein the canopy assembly is configured to allow the canopy to be formed separate from the multi-function cart and utilized as a stand-alone device.

15. The multi-function cart of claim 1, further comprising a pair of bicycle forks that are configured to attach to the bottom adapters in the same manner as the tubes, and a yoke bracket for connecting together two tubes that are attached to the shell as handles to form a yoke thereby converting the shell into a cart or trailer.

16. The multi-function cart of claim 15, further comprising a universal adapter that connects to the yoke bracket, the universal adapter being configured to attach to a bicycle or other vehicle and including swivel joints to allow swiveling in vertical, horizontal, and rotational directions.

17. The multi-function cart of claim 15, wherein the bicycle forks each include a plurality of notches at various heights to enable wheels of different diameters to be connected to the bicycle forks.

18. The multi-function cart of claim 17, wherein the notches are spaced to allow wheels having diameters between 10 and 26 inches to be connected to the bicycle forks.

19. The multi-function cart of claim 15, further comprising brakes for braking the cart or trailer.

20. The multi-function cart of claim 1, wherein one or both of the first and second shells include a drain plug.

21. The multi-function cart of claim 1, wherein the first and second shells are lockable together, and the multi-function cart is lockable to a structure via one or more of the hub brackets.

22. A multi-function cart comprising:
a first and a second shell, each shell having a set of wheels attached on one end, and a lip extending along a top edge of the sides; and
a plurality of interchangeable tubes;
wherein each shell has a pair of hub brackets attached on opposing sides of the shell, each pair of hub brackets being configured with corresponding holes for storing one or more interchangeable tubes;
wherein each hub bracket also includes a top and a bottom adapter, each adapter being configured to receive any of the interchangeable tubes, each of the hub brackets being positioned on the sides of the shell so that an opening is formed between the lip and the hub bracket into which any of the interchangeable tubes can be inserted to form a handle for the shell, and so that the first shell can be secured to the second shell when the second shell is aligned with the first shell by connecting each top adapter on the first shell to an opposing top adapter on the second shell.

23. A multi-function cart comprising:
a plurality of tubes;
a first shell comprising:
　a first side;
　a second side opposing the first side;
　a lip extending along a top edge of the first and second sides;
　a set of wheels; and
　a first pair of hub brackets attached on the first sides of the first shell and a second pair of hub brackets attached on the second side of the first shell, each of the hub brackets being positioned on the sides of the shell so that an opening is formed between the lip and the hub bracket into which any of the interchangeable tubes can be inserted to form a handle for the shell, each hub bracket including a top and a bottom adapter that are each configured to allow any of the tubes to be attached thereto, each hub bracket also having at least one hole through which a tube can be inserted, each pair of hub brackets being aligned on the corresponding side of the first shell so that one or more tubes can be stored along the surface of the first shell by inserting each tube through a corresponding hole in each hub bracket of the pair of hub brackets; and
a second shell comprising:
　a first side;
　a second side opposing the first side;
　a lip extending along a top edge of the first and second sides;
　a balancing block; and
　a first pair of hub brackets attached on the first side of the second shell and a second pair of hub brackets attached on the second side of the second shell, each of the hub brackets being positioned on the sides of the shell so that an opening is formed between the lip and the hub bracket into which any of the interchangeable tubes can be inserted to form a handle for the shell, each hub bracket including a top and a bottom adapter that are each configured to allow any of the tubes to be attached thereto, each hub bracket also having at least one hole through which a tube can be inserted, each pair of hub brackets being aligned on the corresponding side of the second shell so that one or more tubes can be stored along the surface of the second shell by inserting each tube through a corresponding hole in each hub bracket of the pair of hub brackets;
wherein the hub brackets on the first and second shell are aligned so that the first shell can be secured to the second shell when the second shell is aligned with the first shell by connecting each top adapter on the first shell to an opposing top adapter on the second shell.

* * * * *